US011018567B2

(12) United States Patent
Liang et al.

(10) Patent No.: US 11,018,567 B2
(45) Date of Patent: May 25, 2021

(54) PERMANENT MAGNET ROTOR WITH ENHANCED DEMAGNETIZATION PROTECTION

(71) Applicant: Ford Global Technologies, LLC, Dearborn, MI (US)

(72) Inventors: Feng Liang, Troy, MI (US); Lusu Guo, Canton, MI (US); Michael W. Degner, Novi, MI (US); Wei Wu, Northville, MI (US); Chun Tang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 840 days.

(21) Appl. No.: 15/720,754

(22) Filed: Sep. 29, 2017

(65) Prior Publication Data

US 2019/0103795 A1    Apr. 4, 2019

(51) Int. Cl.
| | | |
|---|---|---|
| *H02K 23/04* | (2006.01) | |
| *H02K 1/17* | (2006.01) | |
| *H02K 23/42* | (2006.01) | |
| *H02K 1/12* | (2006.01) | |
| *H02K 1/27* | (2006.01) | |

(52) U.S. Cl.
CPC .............. *H02K 23/04* (2013.01); *H02K 1/12* (2013.01); *H02K 1/17* (2013.01); *H02K 1/2766* (2013.01); *H02K 23/42* (2013.01); *H02K 2213/03* (2013.01)

(58) Field of Classification Search
CPC ........ H02K 23/04; H02K 1/2766; H02K 1/17; H02K 11/022; H02K 23/42; H02K 1/12; H02K 2213/03; H02K 1/2706

USPC ...................................... 310/154.01, 154.21
See application file for complete search history.

(56) References Cited

U.S. PATENT DOCUMENTS

| | | | |
|---|---|---|---|
| 6,359,359 B1 | 3/2002 | Miura et al. | |
| 7,847,461 B2 | 12/2010 | Rahman et al. | |
| 8,624,457 B2* | 1/2014 | Sakai | H02K 1/2766 310/156.43 |
| 2010/0079025 A1* | 4/2010 | Suzuki | H02K 1/2766 310/156.11 |
| 2011/0079325 A1* | 4/2011 | Doi | H02K 1/2766 148/108 |
| 2011/0080066 A1* | 4/2011 | Doi | H02K 1/278 310/156.43 |
| 2011/0210810 A1* | 9/2011 | Miyata | H01F 41/0266 335/302 |

(Continued)

OTHER PUBLICATIONS

Received STIC search report from EIC 2800 searcher Samir Patel on Nov. 12, 2019. (Year: 2019).*

*Primary Examiner* — Shawki S Ismail
*Assistant Examiner* — Htet Z Kyaw
(74) *Attorney, Agent, or Firm* — David B. Kelley; Brooks Kushman P.C.

(57) ABSTRACT

A permanent magnet machine includes a rotor and an irregular polyhedron shaped magnet assembly. The rotor may define at least one magnet opening and may be configured to rotate within a circular opening defined by a stator. The irregular polyhedron shaped magnet assembly may be disposed in the magnet opening and may define a magnetization direction, wherein a height along the magnetization direction and perpendicular with a lamination plane of the rotor is greater at both ends than at a central portion disposed therebetween.

16 Claims, 9 Drawing Sheets

(56) References Cited

U.S. PATENT DOCUMENTS

| | | | |
|---|---|---|---|
| 2011/0285239 A1* | 11/2011 | Leonardi | B60L 15/2009 |
| | | | 310/156.53 |
| 2011/0304235 A1* | 12/2011 | Hashiba | H02K 1/223 |
| | | | 310/156.76 |
| 2012/0126637 A1* | 5/2012 | Ankeney | H02K 15/03 |
| | | | 310/43 |
| 2012/0127845 A1* | 5/2012 | Kimura | G11B 7/0932 |
| | | | 369/112.23 |
| 2013/0127280 A1* | 5/2013 | Sugimoto | B60L 15/2045 |
| | | | 310/156.01 |
| 2013/0147303 A1 | 6/2013 | Kaiser et al. | |
| 2013/0270949 A1 | 10/2013 | Gracia et al. | |
| 2013/0307365 A1* | 11/2013 | Sekiya | H02K 1/276 |
| | | | 310/156.46 |
| 2013/0342299 A1* | 12/2013 | Doi | H02K 1/2786 |
| | | | 335/306 |
| 2014/0167549 A1* | 6/2014 | Huang | H02K 1/246 |
| | | | 310/156.07 |
| 2014/0167550 A1 | 6/2014 | Huang et al. | |
| 2014/0175932 A1 | 6/2014 | Huang et al. | |
| 2014/0217849 A1* | 8/2014 | Soma | H02K 1/276 |
| | | | 310/156.53 |
| 2015/0001980 A1* | 1/2015 | Zhang | H02K 1/02 |
| | | | 310/156.43 |
| 2015/0372578 A1* | 12/2015 | Matsuda | H02K 1/276 |
| | | | 310/156.07 |
| 2018/0133751 A1* | 5/2018 | Kuribayashi | B05B 5/082 |

* cited by examiner

PERMANENT MAGNET ROTOR WITH ENHANCED DEMAGNETIZATION PROTECTION

TECHNICAL FIELD

This application generally relates to permanent magnet configurations for a rotor of an electric machine.

BACKGROUND

Hybrid-electric and electric vehicles utilize one or more electric machines to provide propulsion for the vehicle. A variety of electric machine technologies are available for such applications. Permanent magnet machines are a typical choice for vehicle applications. The permanent magnet machine includes a stator and a rotor. The rotor is constructed with permanent magnets. Coils in the stator are energized to create an electromagnetic flux that interacts with electromagnetic flux created by the permanent magnets of the rotor. The interaction of the fluxes causes the rotor to rotate. When subjected to external magnetic fields, including fields generated by the windings of the stator, and/or temperature changes, the magnetic properties of permanent magnets may change, leading to demagnetization, which may affect the performance of the electric machine. As one example, demagnetization may decrease the output torque and the efficiency of the motor.

SUMMARY

A permanent magnet machine includes a rotor and an irregular polyhedron shaped magnet assembly. The rotor may define at least one magnet opening and may be configured to rotate within a circular opening defined by a stator. The irregular polyhedron shaped magnet assembly may be disposed in the magnet opening and may define a magnetization direction, wherein a height along the magnetization direction and perpendicular with a lamination plane of the rotor is greater at both ends than at a central portion disposed therebetween.

A permanent magnet machine includes a rotor defining at least one magnet opening; and an irregular polyhedron shaped magnet assembly. The irregular polyhedron shaped magnet assembly may be disposed in the magnet opening, have a magnetization direction, and have a cross sectional area that is greater at outer surfaces along an axis perpendicular to the magnetization direction and parallel with a lamination plane of the rotor than at a central portion disposed between the outer surfaces.

A permanent magnet machine includes a rotor and an irregular polyhedron shaped magnet assembly. The rotor may define at least one magnet opening and may be configured to rotate within a circular opening defined by a stator. The irregular polyhedron shaped magnet assembly, disposed in the magnet opening, may define an axis perpendicular to a magnetization direction of the magnet assembly and parallel with rotor laminations, and may have coercivity that varies along the axis.

DETAILED DESCRIPTION

Figure 1:
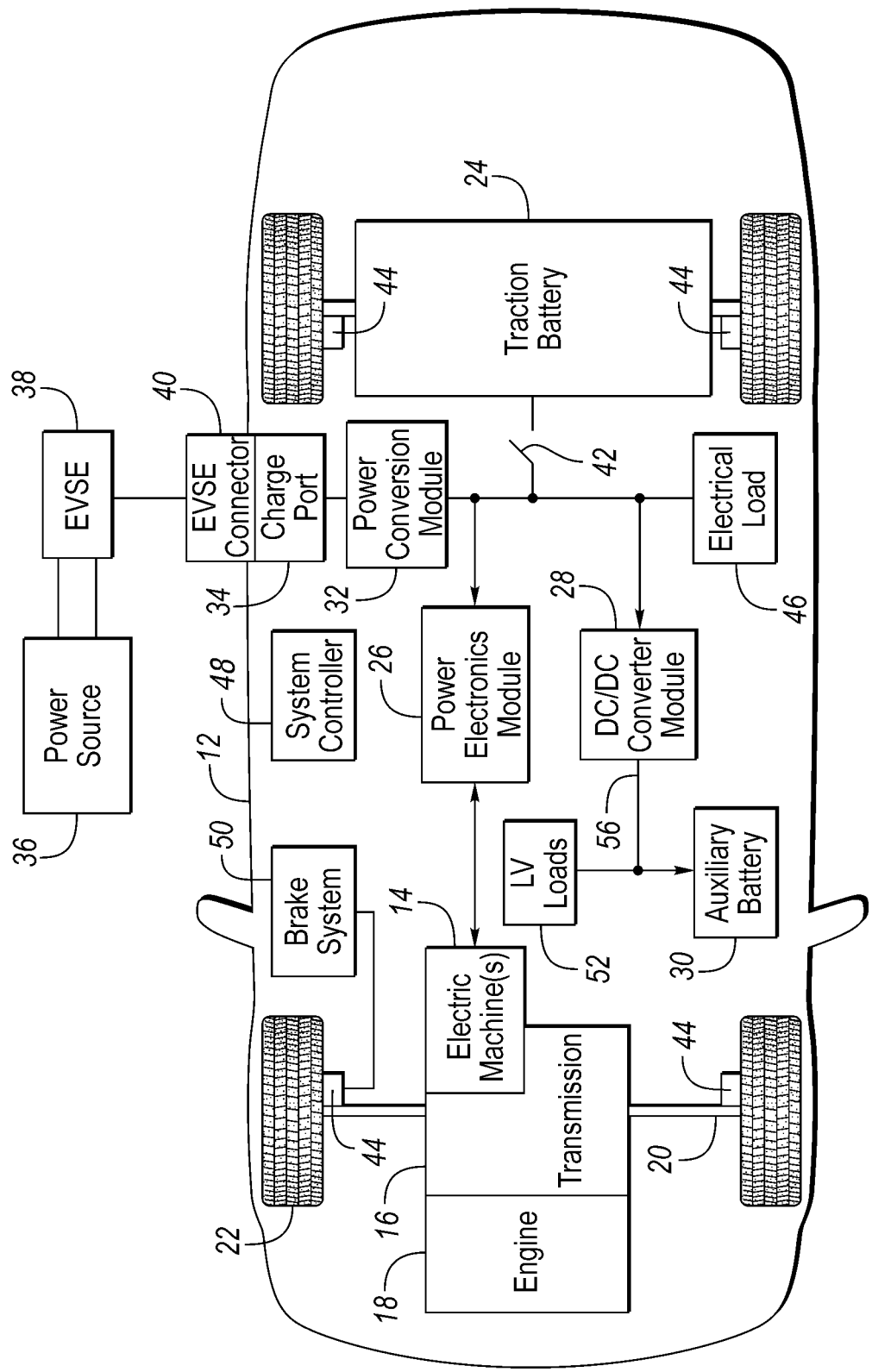
FIG. 1 is a diagram of a hybrid vehicle illustrating typical drivetrain and energy storage components including an electric machine.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

During operation of a permanent magnet electric machine, a magnet may experience a demagnetization created by the stator current such that the demagnetization is not uniform across the magnet surface. In some instances, two corners of the magnet may become demagnetized while the center part is not demagnetized. The two corners of the magnet are typically the corners that are closest to the stator and where the induced magnetic field by the stator is the greatest. Here, the magnets are configured to reduce the corner demagnetization by altering the magnet thickness of the magnet to reduce or eliminate the demagnetization at the corners. The thickness of the magnet changes along the magnetization axis of the magnet, and a magnetic field is generated by the current in the stator winding such that the magnetic field extended into the rotor.

A magnetization direction of a magnet is the direction along which the magnetic flux lines in a magnet run in parallel after the magnet is magnetized. If the magnet is an anisotropic the magnetization direction is aligned with the easy axis of the magnet. If the magnet is anisotropic, the magnetization direction is aligned with the easy axis of the magnet. The orientation of the magnet may be described by the magnetization direction of the magnet. Consider, for example, a magnet in the rotor as a rectangular prism shape, having a height H, a length L, and a width. The dimension height is along the magnetization direction of the magnet, the dimension length is along the axial direction of the rotor, and the dimension width is along the direction that is orthogonal to the height and length directions. For reference, consider the magnet in the rotor as a rectangular prism shape, having, atop of the magnet is a pole surface of the magnet that is substantially perpendicular with the easy axis of the magnet and closest to the stator, and a bottom is of the magnet is the other pole surface of the magnet that is substantially perpendicular with the magnetization direction of the magnet and farthest from the stator. Also, a front of the magnet is a surface of the magnet that is substantially parallel with the magnetization direction of the magnet and closest to the stator, and a back of the magnet is a surface of the magnet that is substantially parallel with the magnetization direction of the magnet and farthest from the stator.

Here, the shape of the magnet is designed to reduce or substantially eliminate demagnetization at the corners of the magnet. To achieve the reduction in demagnetization, the magnet is constructed in a non-rectangular prismatic shape such that edges (i.e., a front surface, a back surface) of the magnet have a greater thickness than the center. Advantages of this variable thickness magnet are that for an equal magnet demagnetization requirement a magnet volume can be reduced for cost reduction or for the equal demagnetization requirement and an equal magnet volume performance of the electric machine can be improved.

FIG. 1 depicts an electrified vehicle 12 that may be referred to as a plug-in hybrid-electric vehicle (PHEV). A plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 may also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. An electrified vehicle 12 may also be a battery electric vehicle (BEV). In a BEV configuration, the engine 18 may not be present. In other configurations, the electrified vehicle 12 may be a full hybrid-electric vehicle (FHEV) without plug-in capability.

A traction battery or battery pack 24 stores energy that can be used by the electric machines 14. The vehicle battery pack 24 may provide a high voltage direct current (DC) output. The traction battery 24 may be electrically coupled to one or more power electronics modules 26. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase alternating current (AC) to function. The power electronics module 26 may convert the DC voltage to a three-phase AC voltage to operate the electric machines 14. In a regenerative mode, the power electronics module 26 may convert the three-phase AC voltage from the electric machines 14 acting as generators to the DC voltage compatible with the traction battery 24.

The vehicle 12 may include a variable-voltage converter (VVC) 52 electrically coupled between the traction battery 24 and the power electronics module 26. The VVC 52 may be a DC/DC boost converter configured to increase or boost the voltage provided by the traction battery 24. By increasing the voltage, current requirements may be decreased leading to a reduction in wiring size for the power electronics module 26 and the electric machines 14. Further, the electric machines 14 may be operated with better efficiency and lower losses.

In addition to providing energy for propulsion, the traction battery 24 may provide energy for other vehicle electrical systems. The vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery) for charging the auxiliary battery 30. The low-voltage systems may be electrically coupled to the auxiliary battery 30. One or more electrical loads 46 may be coupled to the high-voltage bus.

The electrical loads 46 may have an associated controller that operates and controls the electrical loads 46 when appropriate. Examples of electrical loads 46 may be a fan, an electric heating element and/or an air-conditioning compressor.

The electrified vehicle 12 may be configured to recharge the traction battery 24 from an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2B:
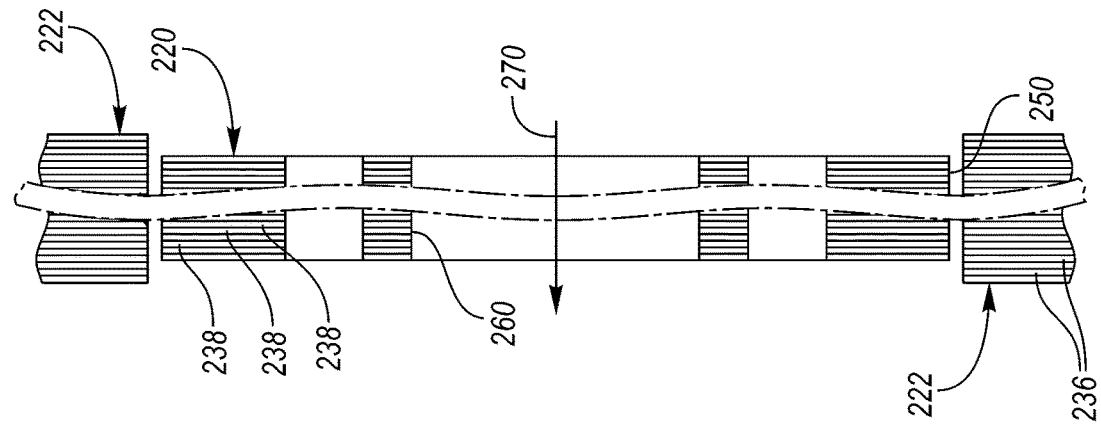
FIG. 2B is a side view of a rotor constructed of a series of rotor laminations.
Figure 2A:
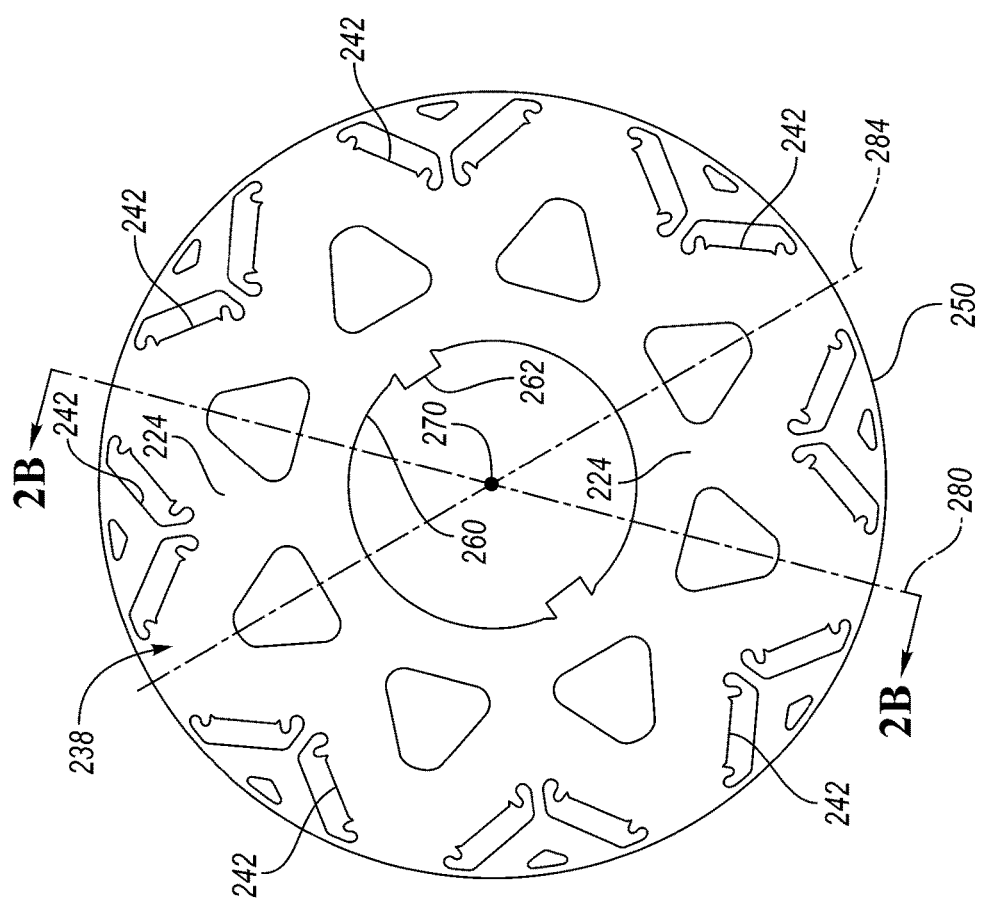
FIG. 2A is a top view of a rotor lamination.

The electric machines 14 may be Interior Permanent Magnet (IPM) machines that include a stator 222 and a rotor 220. FIG. 2A depicts an example rotor lamination 238 and FIG. 2B depicts a side view of a stator 222 and rotor 220 configurations having multiple rotor laminations 238 and multiple stator laminations 236 arranged in an axially stacked relationship. The rotor laminations 238 may define a circular central opening 260, around the central axis 270, for accommodating a drive shaft with a keyway that may receive a drive key 262. The rotor laminations 238 may define a plurality of magnet openings 242 that are symmetrically disposed with respect to adjacent pairs of magnet openings 242.

A plurality of rotor sectors 224 corresponding to poles of the rotor may be defined by a plurality of inter-polar axes (e.g., 280, 284) emanating from the central axis 270 of rotation to an outer surface 250 of the rotor lamination 238. Each of the sectors 224 may include a pair of magnet openings 242. The inter-polar axes (e.g., 280, 284) may be positioned to be midway between adjacent magnet openings 242. Note that FIG. 2A only shows two of the possible inter-polar axes 280, 284 and does not show all possible inter-polar axes. FIG. 2B depicts a series of axially stacked rotor laminations 238 that are stacked along the central axis 270 about which the rotor 220 is configured to rotate.

Figure 3:
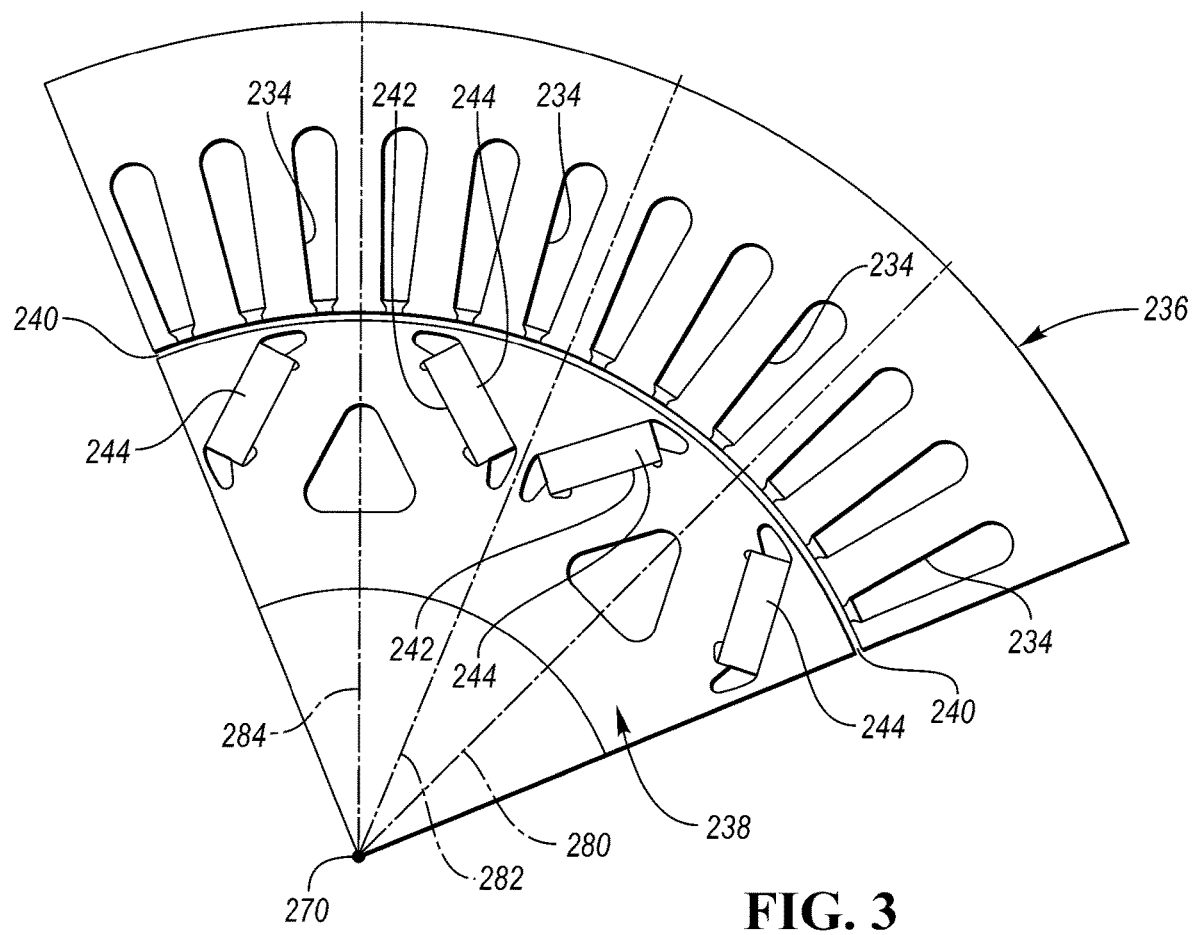
FIG. 3 is a partial rotor and stator lamination.

FIG. 3 depicts a partial radial cross-sectional view of a possible construction of the rotor 220 and the stator 222. A partial stator lamination 236 and a partial rotor lamination 238 are depicted in FIG. 3. The rotor laminations 238 and the stator laminations 236 may be comprised of a ferrous alloy. A small air gap 240 is located between the inner periphery of the stator laminations 236 and the outer periphery 250 of the rotor laminations 238. The stator laminations 236 may define radially extending openings 234.

The rotor laminations 238 may define symmetrically positioned magnet openings 242 near the outer periphery 250 of each rotor lamination 238. Each magnet opening 242 may be configured to receive a magnet 244. Any number of laminations in a given design may be used, depending on design choice. The rotor laminations 238 and the stator laminations 236 may be arranged in a stack along the axis 270 of rotation. The axially stacked rotor laminations 238 and the magnets 244 may define a plurality of magnetic poles distributed about the axis 270.

The stator 236 may have conductors disposed in the radially extending openings 234 to form windings. The stator 222 may be comprised of an iron core made of a stack of stator laminations 236 and a winding arrangement for conductors that carry an excitation current. Current flowing through the stator winding generates a stator electromagnetic flux. The stator flux may be controlled by adjusting the magnitude and frequency of the current flowing through the stator windings.

The rotor 220 may be comprised of an iron core made of a stack of rotor laminations 238 and sets of permanent magnets 244 inserted within holes or cavities 242 that are defined by the iron core. The permanent magnets 244 in the rotor 220 may generate a rotor magnetic flux. The stator flux and the rotor flux may be distributed in the air-gap 240. Interaction between the stator flux and the rotor flux causes the rotor 220 to rotate about the axis 270.

Poles of the rotor 220 may be geometrically defined to correspond to the sectors 224 defined by the rotor laminations 238. Each of the poles may be represented by a sector 224. A pole location may be generally defined by a center-pole axis 282 that extends radially from the axis 270 toward the outer surface 250 of the rotor 238 along a midpoint between adjacent magnet openings 242. The inter-polar axes (e.g., 280, 284) may extend radially from the axis 270 toward the outer surface 250 of the rotor 238 between adjacent poles. An angular distance between two adjacent poles may define a pole pitch parameter. The arc length on the circumferential rotor surface 250 between two adjacent poles of the rotor may be referred to as the pole pitch. The pole pitch may be measured circumferentially around the outer rotor surface 250 between adjacent center-pole axes 282. Each pole may have an associated surface area on the outer circumferential surface 250 of the rotor 220. Each pole may be represented by the arc length on the surface between adjacent inter-polar axes 280, 284.

Figure 4:
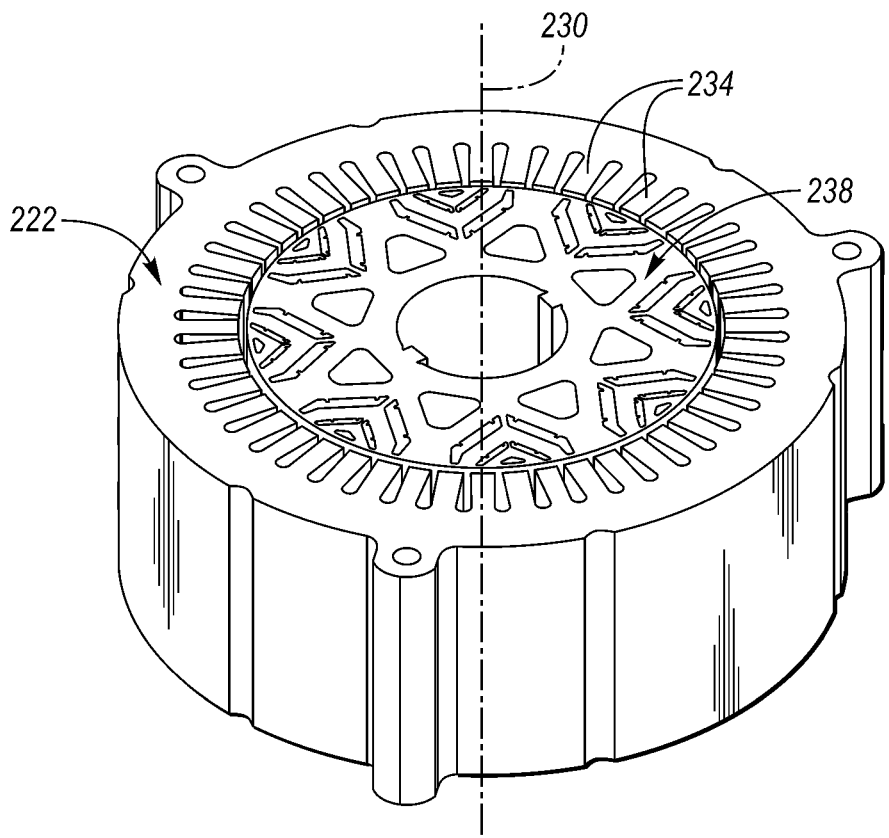
FIG. 4 is a perspective view of a rotor and stator.

FIG. 4 is a perspective view of a rotor 238 and stator 222. The stator 222 has teeth 234 separated by stator winding cavities or slots that are configured to support a set of stator windings. When a current is passed through the stator windings in the slots, a magnetic field is induced in the teeth 234 that extends outward towards and passing through the rotor 238.

Figure 5:
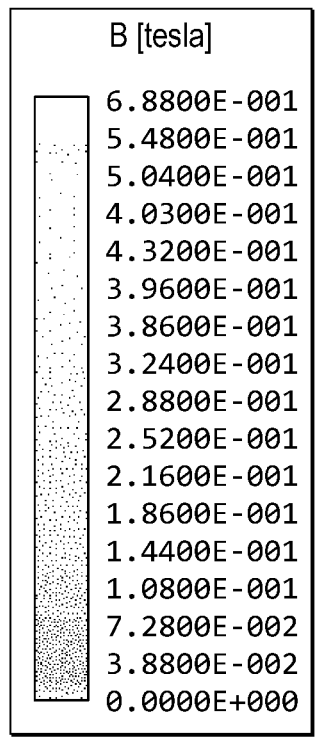
FIG. 5 is a side view of the rotor lamination and a permanent magnet embedded in the rotor illustrating demagnetization.
Figure 5:
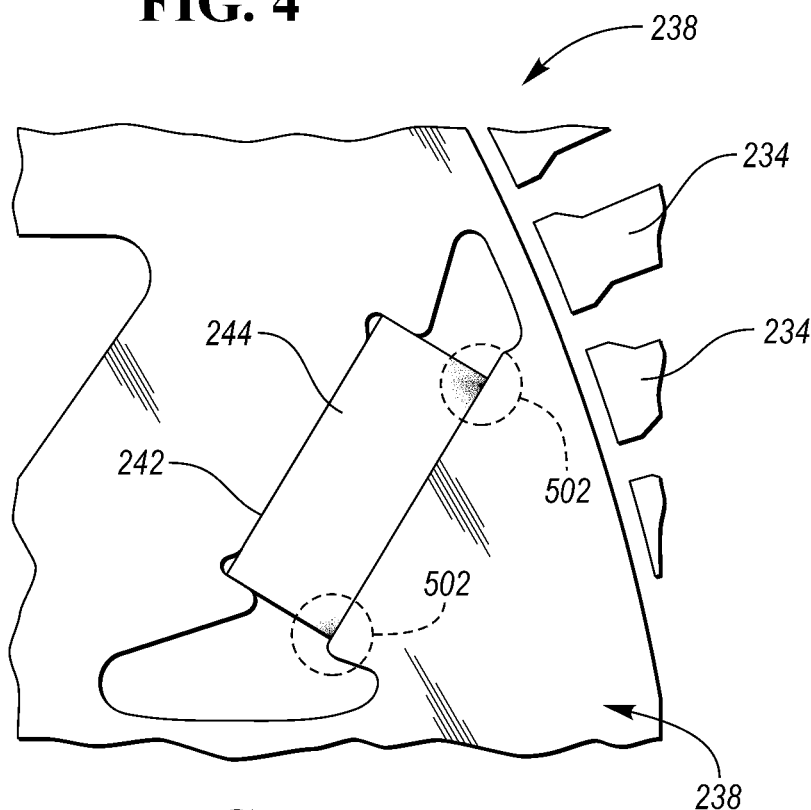

FIG. 5 is a side view of the rotor 238 and a permanent magnet 244 embedded in a magnetic opening 242 of the rotor illustrating demagnetization areas 502 due to interaction of a magnetic field emanating from the stator teeth 234 and the magnet 244. The magnetic field induced by the stator current passes through the stator teeth 234 and the rotor 238 to interact with the magnet 244 in the magnet opening 242. Some areas of the magnet 244 in the magnet opening 242 may become demagnetized due to an opposing magnetic field generated by the stator current and channeled to the magnet 244 by the stator teeth 234 during operation. Also, magnet 244 in the magnet opening 242 may become partially demagnetized due to heat generated by energy losses in the magnets caused by changing magnetic field in the magnets.

Here in FIG. 5, areas of demagnetization 502 are shown on a top surface of the magnet. As described above, this rectangular prismatic magnet 244 has field lines (not shown) that run substantially parallel with the thickness inside the magnet when no external field is applied and such that the magnetic field will emanate from a front (e.g., north or south pole) and back (e.g., south or north pole) of the magnet. Here, the orientation of the magnet is designated such that the top of the magnet is the surface with both demagnetization areas 502 and is perpendicular with the lamination planes of the rotor, while there is a bottom of the magnet that opposes the top of the magnet.

Figure 6:
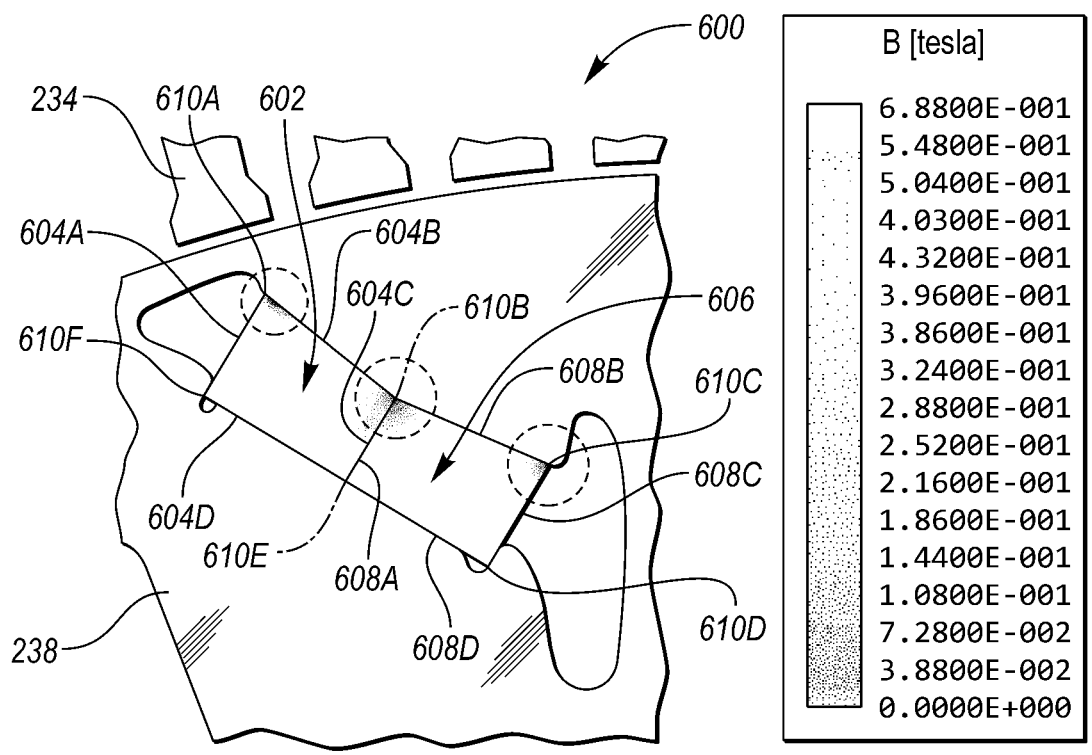
FIG. 6 is a side view of the rotor and an irregular polyhedron shaped magnet assembly including two quadrilateral permanent magnets embedded in the rotor configured to reduce demagnetization of the magnet assembly.

FIG. 6 is a side view of rotor 238, stator teeth 234, and an irregular polyhedron shaped magnet assembly (602, 606) including two quadrilateral permanent magnets (602, 606) embedded in the rotor 238 configured to reduce demagnetization of the magnet assembly.

Generally, a polyhedron is a three-dimensional solid with flat polygonal faces, straight edges and sharp corners or vertices. However, in this application, the term polyhedron is a three-dimensional solid that may include curved polygonal faces, curved edges and rounded corners or vertices. Likewise, in this application, an irregular polyhedron is a three-dimensional solid in three dimensions with flat polygonal faces, straight edges and sharp corners or vertices. In practice, and in this application, the magnets do not have sharp corners, but rather rounded corners and the pole surfaces are not limited to flat polygonal faces. In this application, sharp corners will actually have a small roundness to them as common in industry.

Also, in two-dimensional space, a quadrilateral or tetragon is a polygon with four edges (or sides) and four vertices or corners while a pentagon has 5 sides and a hexagon has 6-sides. A convex quadrilateral or trapezoid is such that all interior angles are less than 180° and the two diagonals both lie inside the quadrilateral. Also, a concave surface curves in or hollows inward, while a convex surface curves out or extends outward. If one surface is curved and the opposite surface is straight, the object may be referred to as either a plano-concave or plano-convex element.

In FIG. 6, the irregular polyhedron shaped magnet assembly is illustrated as two magnets (602, 606), the first magnet 602 is illustrated as a quadrilateral prism, which is a three-dimensional solid with two quadrilateral surfaces or faces (e.g., substantially parallel with the rotor laminations) at either end joined by four rectangular faces (604A, 604B, 604C, and 604D). Here, the pole surface is perpendicular with the magnet magnetization direction, in other words, the poles of the magnet are a second face 604B and a fourth face 604D. The second magnet 606 is illustrated as a quadrilateral prism in which the four rectangular faces (608A, 608B, 608C, and 608D). Here the poles of the magnet are a second face 608B and a fourth face 608D. The magnets (602, 606) are arranged such that if the first magnet's face 604B is a north pole and the first magnet's face 604D is a south pole, then the second magnet's face 608B would be a north pole and the second magnet's face 608D would be a south pole such that they would be in parallel. Having the magnets in parallel creates a field through both magnets that can interact with the stator teeth 234 when a current is modulated through the stator windings (not shown) to generate a torque at the rotor 238 that causes the rotor 238 to rotate with respect to the stator 234. The magnetic assembly is shown with 6 corners, a first magnet assembly corner 610A, a second magnet assembly corner 610B, a third magnet assembly corner 610C, a forth magnet assembly corner 610D, a fifth magnet assembly corner 610E, and a sixth magnet assembly corner 610F. When the electric machine is operating, the interaction between the induced magnetic field from the stator teeth 234 acting on the permanent magnets (602, 606) causes demagnetization in certain areas. By changing the shape and arrangement of the magnets, the demagnetization can be reduced. Here the magnets (602, 606) are configured such that a cross sectional area that includes a height along the magnetization direction of the outside face 604A and face 608C (i.e. between points 610A and 610F, or 610C and 610D) is larger than face 604C and face 608A at a central portion along the magnetization direction (i.e. between points 610B and 610E). Here the magnet assembly is illustrated as two quadrilateral prisms, also referred to as tetragonal prisms.

In an embodiment in which the magnet assembly is a single irregular polyhedron shaped magnet in which the sides are a pentagonal shaped with the top surface defined by two planes having a single inner angle greater than 180 degrees. This may be referred to as a single pentagonal prism in which a single inner angle of one corner (e.g., 610B) is greater than 180 degrees. In another embodiment, the top surface (i.e., the surface between points 610A, 610B, and 610C) may be curved and not straight lines.

Figure 7:
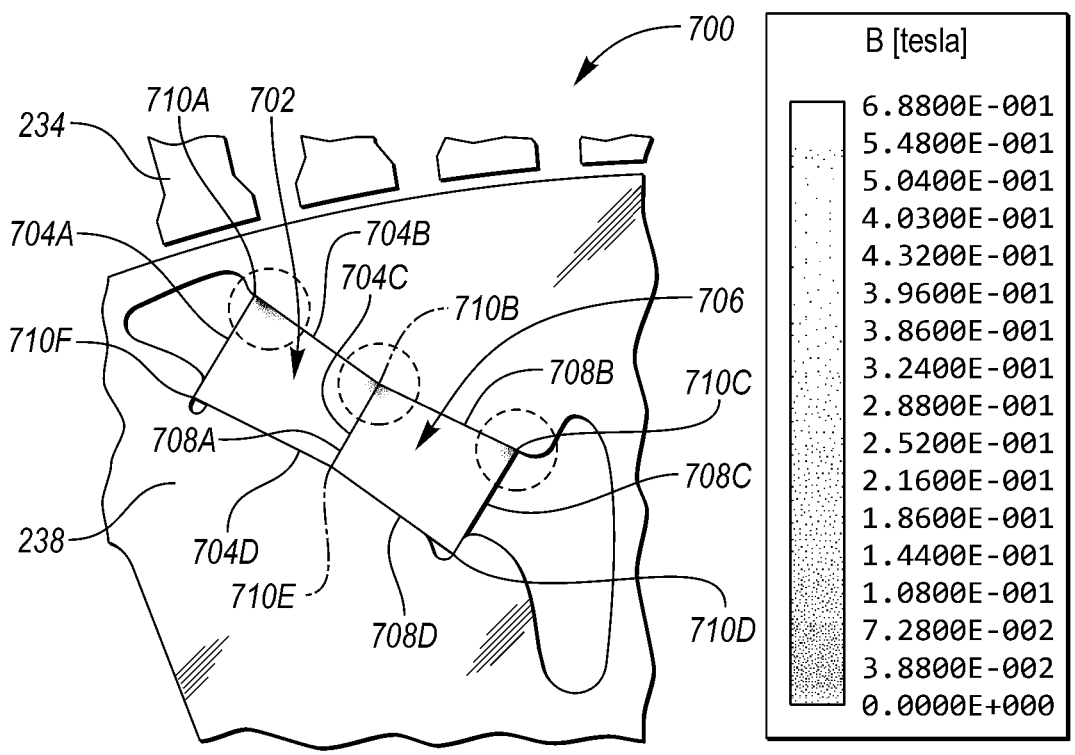
FIG. 7 is a side view of the rotor and an irregular polyhedron shaped magnet assembly including two quadrilateral permanent magnets embedded in the rotor configured to reduce demagnetization of the magnet assembly.

FIG. 7 is a side view of the rotor and an irregular polyhedron shaped magnet assembly including two quadrilateral permanent magnets embedded in the rotor configured to reduce demagnetization of the magnet assembly. In FIG. 7, the irregular polyhedron shaped magnet assembly is illustrated as two magnets (702, 706), the first magnet 702 is illustrated as a quadrilateral prism, which is a three-dimensional solid with two quadrilateral surfaces or faces (e.g., substantially parallel with the rotor laminations) at either end joined by four rectangular faces (704A, 704B, 704C, and 704D). Here the poles of the magnet are face 704B and face 704D. The second magnet 706 is illustrated as a quadrilateral prism in which the four rectangular faces (708A, 708B, 708C, and 708D). Here the poles of the magnet are the 708B and the 708D. The magnets (702, 706) are arranged such that if the first magnet's face 704B is a north pole and the first magnet's pole 704D is a south pole, then the second magnet's face 708B would be a north pole and the second magnet's face 708D would be a south pole such that they would be in parallel. By changing the shape and arrangement of the magnets, the demagnetization can be reduced. Here the magnets (702, 706) are configured such that a cross sectional area that includes a height along the magnetization direction of the outside face 704A and face 708C (i.e. between points 710A and 710F, or 710C and 710D) is larger than face 704C and face 708A that is a central portion (i.e. between points 710B and 710E). Here the magnet assembly is illustrated as two quadrilateral prisms, also referred to as tetragonal prisms. In this embodiment, the magnet assembly has a bow-shaped structure.

A frustum is the portion of a cone or pyramid that remains after its upper part has been cut off by a plane parallel to its base, or that is intercepted between two such planes. The top of the frustum which is where the plane cuts off the upper part is the apex of the frustum. When two frustums are connected, it is called a bifrustum. Typically, a bifrustum is two frustums connected by their bases, however, two frustums may be coupled at the apexes to form a bow-tie type structure (e.g., a bifrustum that is joined at the apexes). Also, a tetragon is a polygon with four edges (or sides) and four vertices or corners for consistency with pentagon (5-sided), hexagon (6-sided). A trapezoid is a specific type of tetragon which is a convex quadrilateral with at least one pair of parallel sides. When considering a bow-tie type structure (e.g., a bifrustum that is joined at the apexes) another way of describing this is as a concave hexagon, and if the bow-tie shaped structure has a square or rectangular center portion, the object may be described as a concave octagon. In other embodiments, the bow-tie shaped structure may have curved lines on the top and/or bottom surfaces.

In an embodiment in which the magnet assembly is a single irregular polyhedron shaped magnet in which the sides are a hexagonal shaped with the top surface defined by two planes having two opposing inner angles greater than 180 degrees. This may be referred to as a single hexagonal prism in which two inner angles of two opposing corner (e.g., 710B and 710E) are greater than 180 degrees. In another embodiment, the top surface (i.e., the surface between points 710A, 710B, and 710C) may be curved and not straight lines. The curve may follow a circular curve, a parabolic curve, a hyperbolic curve, an ellipse, or other common curved shape.

Figure 8:
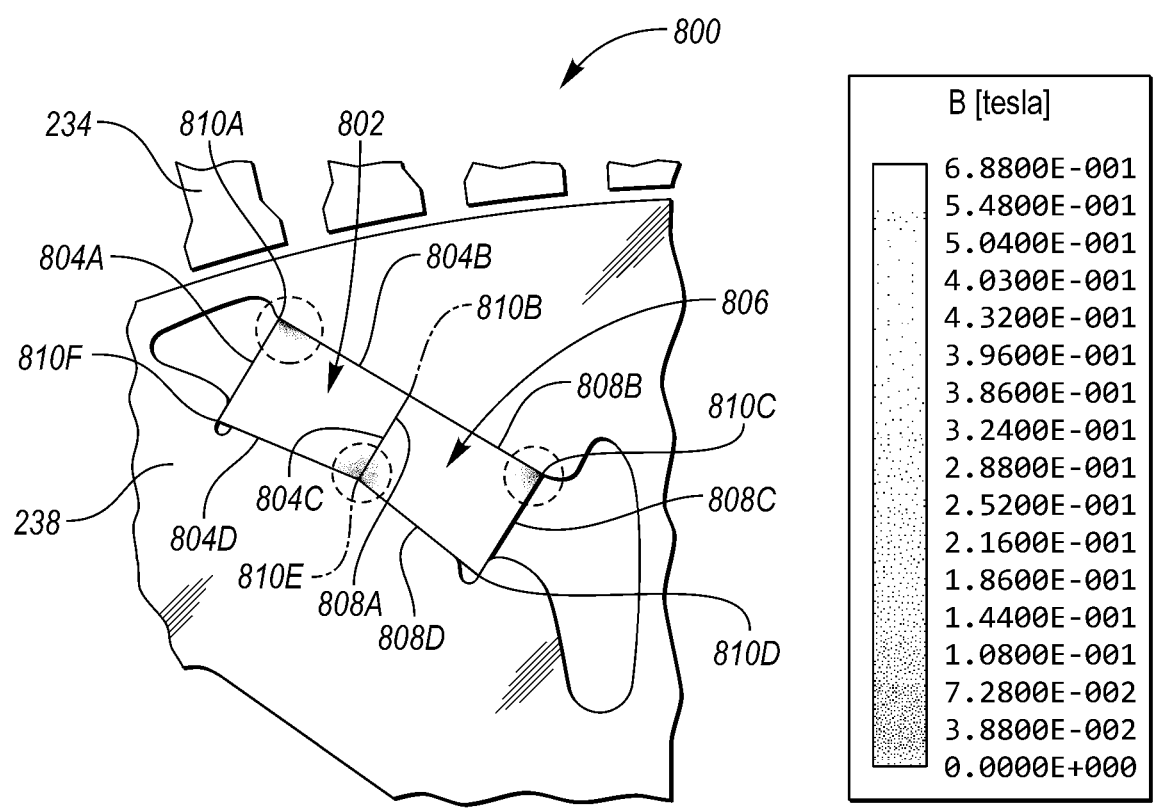
FIG. 8 is a side view of the rotor and an irregular polyhedron shaped magnet assembly including two quadrilateral permanent magnets embedded in the rotor configured to reduce demagnetization of the magnet assembly.

In FIG. 8, the irregular polyhedron shaped magnet assembly is illustrated as two magnets (802, 806), the first magnet 802 is illustrated as a quadrilateral prism, which is a three-dimensional solid with two quadrilateral surfaces or faces (e.g., substantially parallel with the rotor laminations) at either end joined by four rectangular faces (804A, 804B, 804C, and 804D). Here the poles of the magnet are face 804B and face 804D. The second magnet 806 is illustrated as a quadrilateral prism in which the four rectangular faces (808A, 808B, 808C, and 808D). Here the poles of the magnet are face 808B and the third face 808D. The magnets (802, 806) are arranged such that if the first magnet's 804B is a north pole and the first magnet's face 804*d* is a south pole, then the second magnet's face 808B would be a north pole and the second magnet's face 808D would be a south pole such that they would be in parallel. Having the magnets in parallel creates a magnetic field through both magnets that can interact with the stator magnetic flux when a current is modulated through the stator windings (not shown) to generate a torque at the rotor 238 that causes the rotor 238 to rotate with respect to the stator 234. The magnetic assembly is shown with 6 corners, a first magnet assembly corner 810A, a second magnet assembly corner 810B, a third magnet assembly corner 810C, a forth magnet assembly corner 810D, a fifth magnet assembly corner 810E, and a sixth magnet assembly corner 810F. When the electric machine is operating, the interaction between the induced magnetic field from the stator teeth 234 acting on the permanent magnets (802, 806) cause demagnetization in certain areas of the magnets. By changing the shape and arrangement of the magnets, the demagnetization can be reduced. Here the magnets (802, 806) are configured such that a cross sectional area that includes a height along the magnetization direction of the outside face 804A and face 808C (i.e. between points 810A and 810F, or 810C and 810D) is larger than face 804C and face 808A at a central portion (i.e. between points 810B and 810E). Here the magnet assembly is illustrated as two quadrilateral prisms, also referred to as tetragonal prisms.

In an embodiment in which the magnet assembly is a single irregular polyhedron shaped magnet in which the sides are a pentagonal shaped with the top surface defined by two planes having a single inner angle greater than 180 degrees. This may be referred to as a single pentagonal prism in which a single inner angle of one corner (e.g., 810E) is greater than 180 degrees. In another embodiment, the bottom surface (i.e., the surface between points 810D, 810E, and 810F) may be curved and not straight lines.

Figure 9:
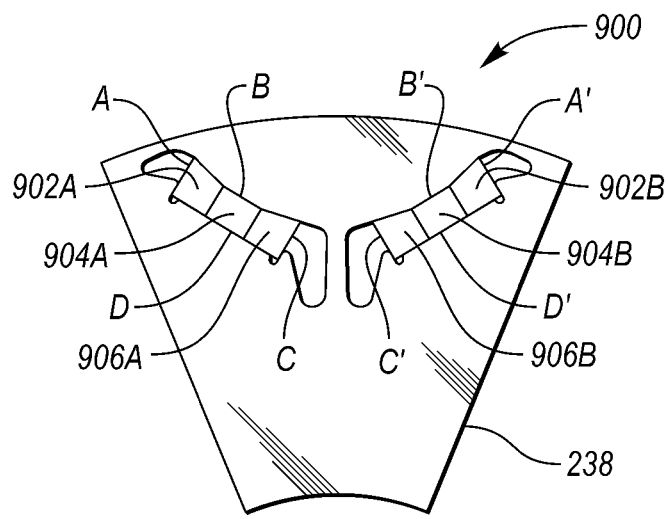
FIG. 9 is a side view of the rotor and a pair of irregular polyhedron shaped magnet assemblies that each include three quadrilateral permanent magnets embedded in the rotor configured to reduce demagnetization of the magnet assembly.

FIG. 9 is a side view of the rotor and a pair of irregular polyhedron shaped magnet assemblies, in which each magnet assembly includes three quadrilateral permanent magnets embedded in the rotor and configured to reduce demagnetization of the magnet assembly. In FIG. 9, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as three magnets (902A, 904A, and 906A), the first magnet 902A is illustrated as a quadrilateral prism, which is a three-dimensional solid with two quadrilateral surfaces or faces (e.g., substantially parallel with the rotor laminations) at either end joined by four rectangular faces that are along the A side, the B side, the C side and the D side. Here the poles of the magnet are the B side and the D side. The second magnet 904A is illustrated as a quadrilateral prism (e.g., a rectangular prism) in which the four rectangular faces are along the A side, the B side, the C side and the D side and the poles of the magnet are the B side and the D side. The third magnet 906A is illustrated as a quadrilateral prism, which is a three-dimensional solid with two quadrilateral surfaces or faces (e.g., substantially parallel with the rotor laminations) at either end joined by four rectangular faces that are along the A side, the B side, the C side and the D side with the poles of the magnet at the B side and the D side. The magnets (902A, 904A, and 906A) are arranged such that if the first magnet's B side is a north pole and the first magnet's D side is a south pole, then the second magnet's B side would be a north pole and the second magnet's D side would be a south pole and so forth with the third magnet such that they would be in parallel. Having the magnets in parallel creates a magnetic field through the three magnets that can interact with the stator magnetic field when a current is modulated through the stator windings (not shown) to generate a torque at the rotor 238 that causes the rotor 238 to rotate with respect to the stator. The magnetic assembly is shown with 8 corners. When the electric machine is operating, the interaction between the induced magnetic field from the stator teeth acting on the permanent magnets (902A, 904A, and 906A) cause demagnetization in certain areas of the magnets. By changing the shape and arrangement of the magnets, the demagnetization can be reduced. Here the magnets (902A, 904A, and 906A) are configured such that a cross sectional area that includes a height along the magnetization direction of side A of magnet 902A and side C of magnet 906A is greater than side C of magnet 902A and side A of magnet 906A at a central portion (i.e. the minimum thickness of magnet 904A.

In an embodiment in which the magnet assembly is a single irregular polyhedron shaped magnet in which the sides are octagonal shaped with the top surface defined by two planes having two inner angles greater than 180 degrees. This may be referred to as a single octagonal prism in which two inner angles of two adjacent corners are greater than 180 degrees. In another embodiment, the top surface (i.e., the surface facing the B side) and/or bottom surface (i.e., the surface facing the D side) may be curved and not straight lines. In FIG. 9, a mirror magnet assembly is shown in which magnets (902B, 904B, and 906B) mirror magnets (902A, 904A, and 906A) along faces A', B', C', and D'.

Figure 10:
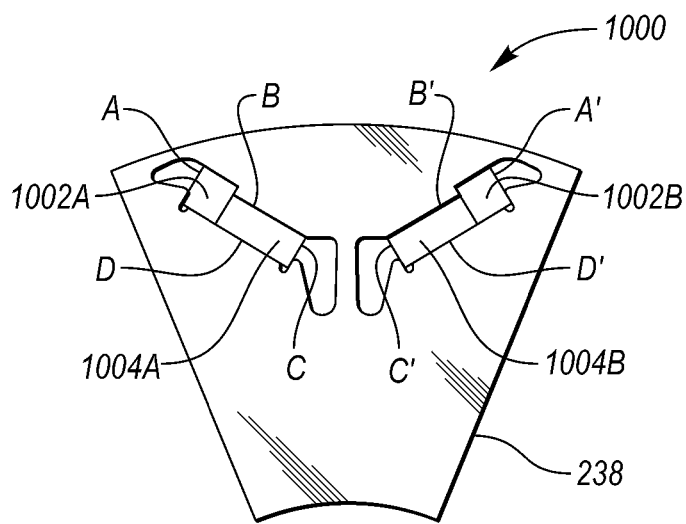
FIG. 10 is a side view of the rotor and a pair of irregular polyhedron shaped magnet assemblies that each include two quadrilateral permanent magnets embedded in the rotor configured to reduce demagnetization of the magnet assembly.

FIG. 10 is a side view of the rotor and a pair of irregular polyhedron shaped magnet assemblies that each include two quadrilateral permanent magnets embedded in the rotor configured to reduce demagnetization of the magnet assembly. In FIG. 10, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as two magnets (1002A, and 1004A), the first magnet 1002A is illustrated as a quadrilateral prism (e.g., a square prism), which is a three-dimensional solid with two quadrilateral surfaces or faces (e.g., substantially parallel with the rotor laminations) at either end joined by four rectangular faces that are along the A side, the B side, the C side and the D side. Here the poles of the magnet are the B side and the D side. The second magnet 1004A is illustrated as a quadrilateral prism (e.g., a rectangular prism) in which the four rectangular faces are along the A side, the B side, the C side and the D side and the poles of the magnet are the B side and the D side. The magnets (1002A, and 1004A) are arranged such that if the first magnet's B side is a north pole and the first magnet's D side is a south pole, then the second magnet's B side would be a north pole and the second magnet's D side would be a south pole such that they would be in parallel. Having the magnets in parallel creates a magnetic field through both magnets that can interact with the stator teeth when a current is modulated through the stator windings (not shown) to generate a torque at the rotor 238 that causes the rotor 238 to rotate with respect to the stator. The magnetic assembly is shown with 7 corners. When the electric machine is operating, the interaction between the induced magnetic field from the stator teeth acting on the permanent magnets (1002A, and 1004A) cause demagnetization in certain areas of the magnets. By changing the shape and arrangement of the magnets, the demagnetization can be reduced. Here the magnets (1002A, and 1004A) are configured such that a cross sectional area that includes a height along the magnetization direction of side A and side C of magnet 1002A that is greater than side A and side C of magnet 1004A. In another embodiment, the composition of the first magnet 1002A may be such that it has a greater coercivity than the second magnet 1004A, such that demagnetization of the magnetic assembly is reduced.

In one embodiment, the magnet assembly may be a single irregular polyhedron shaped magnet in which the sided are multiple sided polygonals with the top surface defined by two planes having two inner angles greater than 180 degrees. This may be referred to as a single hexagonal prism in which one inner angle is greater than 180 degrees. In another embodiment, the top surface (i.e. the face facing B side) and/or the bottom surface (i.e., the surface facing the D side) may be curved and not straight lines.

In FIG. 10, a mirror magnet assembly is shown in which magnets (1002B, and 1004B) mirror magnets (1002A, and 1004A) along faces A', B', C', and D'.

Figure 11:
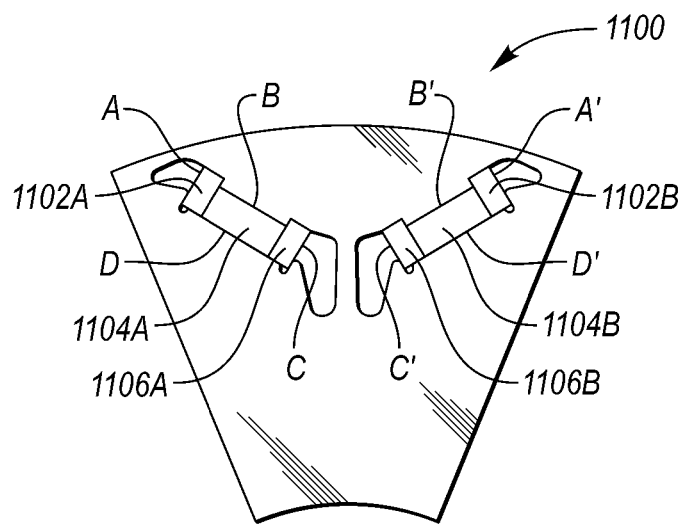
FIG. 11 is a side view of the rotor and a pair of irregular polyhedron shaped magnet assemblies that each include three quadrilateral permanent magnets embedded in the rotor configured to reduce demagnetization of the magnet assembly.

FIG. 11 is a side view of the rotor and a pair of irregular polyhedron shaped magnet assemblies that each include three quadrilateral permanent magnets embedded in the rotor configured to reduce demagnetization of the magnet assembly. In FIG. 11, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as three magnets (1102A, 1104A, 1106A), the first magnet 1102A is illustrated as a quadrilateral prism (e.g., a rectangular prism), which is a three-dimensional solid with two quadrilateral surfaces or faces (e.g., substantially parallel with the rotor laminations) at either end joined by four rectangular faces that are along the A side, the B side, the C side and the D side. Here the poles of the magnet are the B side and the D side. The second magnet 1104A is illustrated as a quadrilateral prism (e.g., a rectangular prism) in which the four rectangular faces are along the A side, the B side, the C side and the D side and the poles of the magnet are the B side and the D side. The third magnet 1106A is illustrated as a quadrilateral prism (e.g., a rectangular prism) in which the four rectangular faces are along the A side, the B side, the C side and the D side and the poles of the magnet are the B side and the D side. The magnets (1102A, 1104A, and 1106A) are arranged such that if the first magnet's B side is a north pole and the first magnet's D side is a south pole, then the second magnet's B side would be a north pole and the second magnet's D side would be a south pole and so forth with the third magnet such that they would be in parallel. Having the magnets in parallel creates a magnetic field through both magnets that can interact with the stator magnetic field when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1102A, 1104A, and 1106A) cause demagnetization in certain areas of the magnets. By changing the shape and arrangement of the magnets, the demagnetization can be reduced. Here the magnets (1102A, 1104A, and 1106A) are configured such that a cross sectional area that includes a height along the magnetization directions of side A and side C of magnet 1102A and magnet 1106A are greater than side A and side C of magnet 1104A. In another embodiment, the composition of the first magnet 1102A may be such that it has a greater coercivity than the second magnet 1104A, such that demagnetization of the magnetic assembly is reduced.

In another embodiment, the magnet assembly is a single irregular polyhedron shaped magnet in which the sides are multiple sided polygonal shaped with the top surface defined by two planes having two inner angles greater than 180 degrees. This may be referred to as a single polygonal prism in which two inner angles of two adjacent corners are greater than 180 degrees. In another embodiment, top surface (i.e. the face facing B side) and/or the bottom surface (i.e., the surface facing the D side) may be curved and not straight lines.

In FIG. 11, a mirror magnet assembly is shown in which magnets (1102B, 1104B, and 1106B) mirror magnets (1102A, 1104A, and 1106A) along faces A', B', C', and D'.

Figure 12:
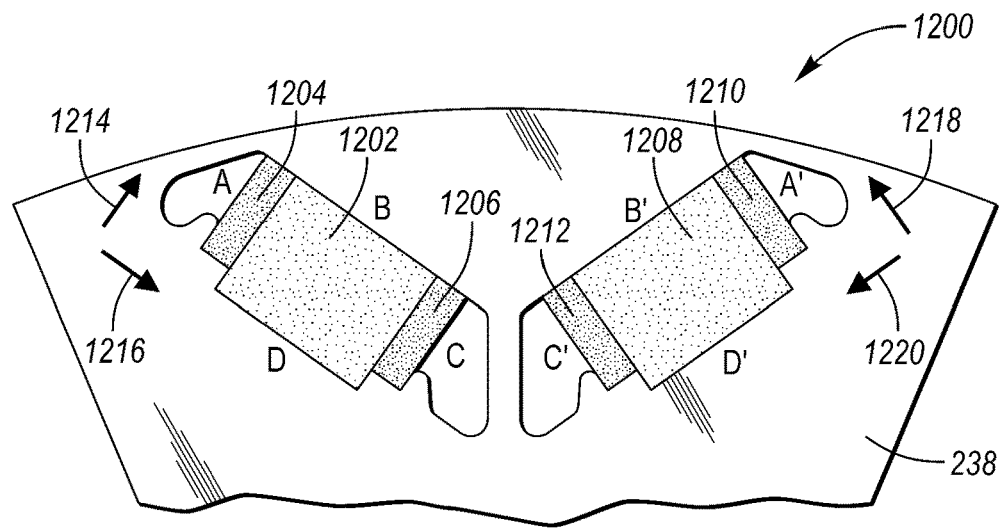
FIG. 12 is a side view of the rotor and a pair of irregular polyhedron shaped magnet assemblies that each include three quadrilateral permanent magnets embedded in the rotor configured to reduce demagnetization of the magnet assembly.

FIG. 12 is a side view of the rotor and a pair of irregular polyhedron shaped magnet assemblies that each include three quadrilateral permanent magnets embedded in the rotor configured to reduce demagnetization of the magnet assembly. In FIG. 12, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as three magnets (1202, 1204, 1206), the first magnet 1202 is illustrated as a quadrilateral prism (e.g., a rectangular prism), having a short height along a first axis 1214 and having a long length along a second axis 1216. The quadrilateral prism is a three-dimensional solid with two quadrilateral surfaces or faces (e.g., substantially parallel with the rotor laminations) at either end joined by four rectangular faces that are along the A side, the B side, the C side and the D side. Here the poles of the magnet are the B side and the D side. The second magnet 1204 is illustrated as a quadrilateral prism, having a long height along a first axis 1214 and having a short length along a second axis 1216. The third magnet 1206 is illustrated as a quadrilateral prism also having a long height along a first axis 1214 and having a short length along a second axis 1216. In this figure, the second and third magnets (1204 and 1206) are approximately equal in size, however, in other embodiments, the second magnet 1204 may be larger than the third magnets 1206. In FIG. 12, the end magnets (1204 and 1206) have a greater coercivity than the central magnet 1202. Both the second and the third magnets (1204, 1206) have four rectangular faces are along the A side, the B side, the C side and the D side and the poles of each magnet (1204, 1206) are along the B side and the D side. The magnets (1202, 1204, and 1206) are arranged such that if the first magnet's B side is a north pole and the first magnet's D side is a south pole, then the second magnet's B side would be a north pole and the second magnet's D side would be a south pole and so forth with the third magnet such that they would be in parallel. Having the magnets in parallel creates a magnetic field through the three magnets that can interact with the stator magnetic field when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1202, 1204, and 1206) cause demagnetization in certain areas of the magnet. By changing the shape and composition of the magnets, the demagnetization can be reduced. Here the magnets (1202, 1204, and 1206) are configured such that magnet 1204 and magnet 1206 have shorter length along axis 1214 than magnet 1202, and magnet 1204 and magnet 1206 have higher coercivity than magnet 1202 such that magnet volume can be reduced for the same demagnetization requirement.

In FIG. 12, a mirror magnet assembly is shown in which magnets (1208, 1210, and 1212) mirror magnets (1202, 1204, and 1206) along mirror axis 1218 and 1220 having faces A', B', C', and D'.

Figure 13:
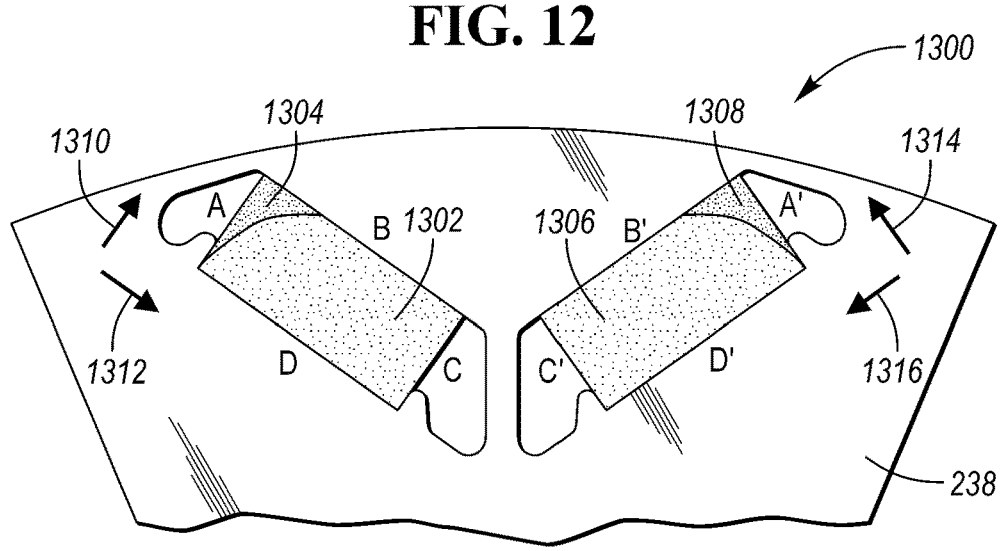
FIG. 13 is a side view of the rotor and a pair of irregular polyhedron shaped magnet assemblies that each include two quadrilateral permanent magnets embedded in the rotor configured to reduce demagnetization of the magnet assembly.

FIG. 13 is a side view of the rotor and a pair of irregular polyhedron shaped magnet assemblies that each include two quadrilateral permanent magnets embedded in the rotor configured to reduce demagnetization of the magnet assembly. In FIG. 13, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as two magnets (1302, 1304), the first magnet 1302 is illustrated generally as a quadrilateral prism, however here the side facing the A side is curved and not straight such that the first magnet 1302 has a short height along a first axis 1310 and a long length along a second axis 1312. Generally, a quadrilateral prism is a three-dimensional solid with two quadrilateral surfaces or faces (e.g., substantially parallel with the rotor laminations) at either end joined by four rectangular faces that are along the A side, the B side, the C side and the D side. Here one of the surfaces (i.e., the A surface) is not along a straight line but follows a curved surface. And the poles of the magnet are the B side and the D side. The second magnet 1304 is illustrated as a quadrilateral prism, having a long height along the first axis 1310 and having a short length along a second axis 1312. Here, the second magnet 1304 has a greater coercivity than the first magnet 1302. The first and second magnets (1302, 1304) are configured to mate with each other such that the poles of each magnet (1302, 1304) are along the B side and the D side. The magnets (1302, and 1304) are arranged such that if the first magnet's B side is a north pole and the first magnet's D side is a south pole, then the second magnet's B side would be a north pole and the second magnet's D side would be a south pole such that they would be in parallel. Having the magnets in parallel creates a magnetic field through both magnets that can interact with the stator teeth when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1302, and 1304) cause demagnetization in certain areas. By changing the shape and composition of the magnets, the demagnetization can be reduced. Here the magnets (1302, and 1304) are configured such that a coercivity is greater at a first magnetic pole (i.e. facing the A side) than at a central portion disposed between the poles (i.e. the central magnet 1302 has a lower coercivity than the first magnets 1304) such that demagnetization of the magnetic assembly is reduced.

In FIG. 13, a mirror magnet assembly is shown in which magnets (1306, and 1308) mirror magnets (1302, and 1304) along mirror axis 1314 and 1316 having faces A', B', C', and D'.

Figure 14:
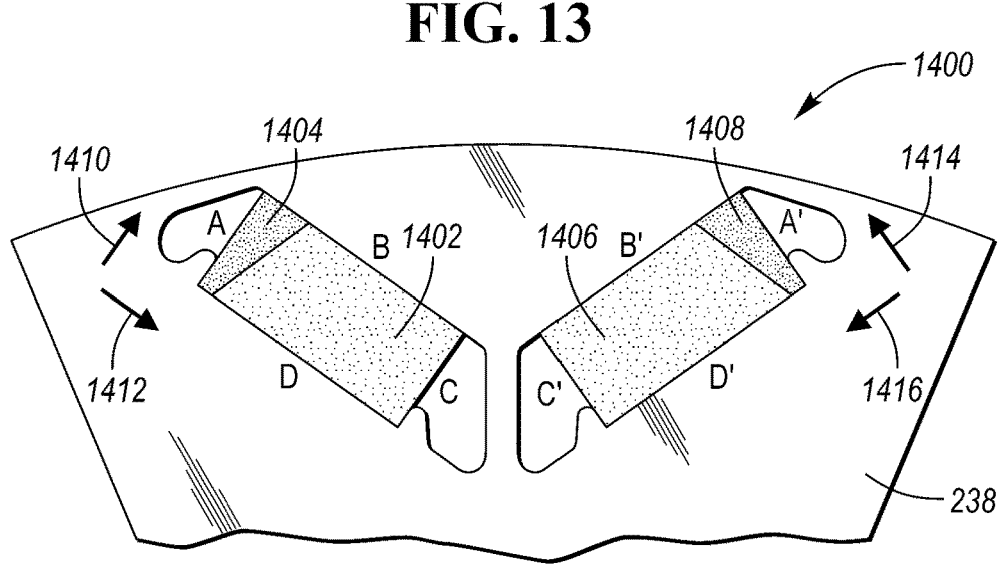
FIG. 14 is a side view of the rotor and a pair of irregular polyhedron shaped magnet assemblies that each include two quadrilateral permanent magnets embedded in the rotor configured to reduce demagnetization of the magnet assembly.

FIG. 14 is a side view of the rotor and a pair of irregular polyhedron shaped magnet assemblies that each include two quadrilateral permanent magnets embedded in the rotor configured to reduce demagnetization of the magnet assembly. In FIG. 14, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as two magnets (1402, 1404), the first magnet 1402 is illustrated as a quadrilateral prism, such that the first magnet 1402 has a short height along a first axis 1410 and a long length along a second axis 1412. Generally, a quadrilateral prism is a three-dimensional solid with two quadrilateral surfaces or faces (e.g., substantially parallel with the rotor laminations) at either end joined by four rectangular faces that are along the A side, the B side, the C side and the D side. And the poles of the magnet are the A side and the C side. The second magnet 1404 is illustrated as a quadrilateral prism, having a long height along the first axis 1410 and having a short length along the second axis 1412. Here, the second magnet 1404 has a greater coercivity than the first magnet 1402. The first and second magnets (1402, 1404) are configured to mate with each other such that the poles of each magnet (1402, 1404) are along the B side and the D side. The magnets (1402, and 1404) are arranged such that if the first magnet's B side is a north pole and the first magnet's D side is a south pole, then the second magnet's B side would be a north pole and the second magnet's D side would be a south pole such that they would be in parallel. Having the magnets in parallel creates a magnetic field through both magnets that can interact with the stator teeth when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1402, and 1404) cause demagnetization in certain areas. By changing the shape and composition of the magnets, the demagnetization can be reduced. Here the magnets (1402, and 1404) are configured such that a coercivity is greater at the second magnet 1404 than the first magnet 1402 such that demagnetization of the magnetic assembly is reduced.

In FIG. 14, a mirror magnet assembly is shown in which magnets (1406, and 1408) mirror magnets (1402, and 1404) along mirror axis 1414 and 1416 having faces A', B', C', and D'.

Figure 15:
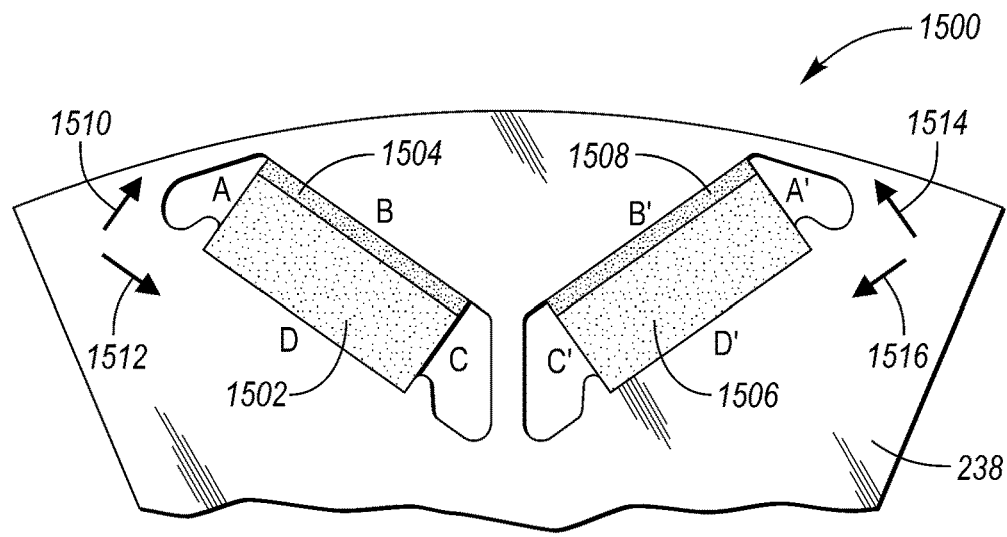
FIG. 15 is a side view of the rotor and a pair of irregular polyhedron shaped magnet assemblies that each include two quadrilateral permanent magnets embedded in the rotor configured to reduce demagnetization of the magnet assembly.

FIG. 15 is a side view of the rotor and a pair of irregular polyhedron shaped magnet assemblies that each include two quadrilateral permanent magnets embedded in the rotor configured to reduce demagnetization of the magnet assembly. In FIG. 15, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as two magnets (1502, 1504), the first magnet 1502 is illustrated as a quadrilateral prism, such that the first magnet 1502 has a short height along a first axis 1510 and a long length along a second axis 1512. Generally, a quadrilateral prism is a three-dimensional solid with two quadrilateral surfaces or faces (e.g., substantially parallel with the rotor laminations) at either end joined by four rectangular faces that are along the A side, the B side, the C side and the D side. And the poles of the magnet are the B side and the D side. The second magnet 1504 is illustrated as a quadrilateral prism, having a long height along the first axis 1510 and having a short length along the second axis 1512. Here, the second magnet 1504 has a greater coercivity than the first magnet 1502. The first and second magnets (1502, 1504) are configured to mate with each other such that the poles of each magnet (1502, 1504) are along the B side and the D side. The magnets (1502, and 1504) are arranged such that if the first magnet's B side is a north pole and the first magnet's D side is a south pole, then the second magnet's B side would be a north pole and the second magnet's D side would be a south pole such that they would be in series. The magnet assembly creates a magnetic field that interacts with the stator magnetic field when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1502, and 1504) cause demagnetization in certain areas. By changing the shape and composition of the magnets, the demagnetization can be reduced. Here the magnets (1502, and 1504) are configured such that a coercivity of the second magnet 1504 is greater than the first magnet 1502 such that demagnetization of the magnetic assembly is reduced.

In FIG. 15, a mirror magnet assembly is shown in which magnets (1506, and 1508) mirror magnets (1502, and 1504) along mirror axis 1514 and 1516 having faces A', B', C', and D'.

Figure 16:
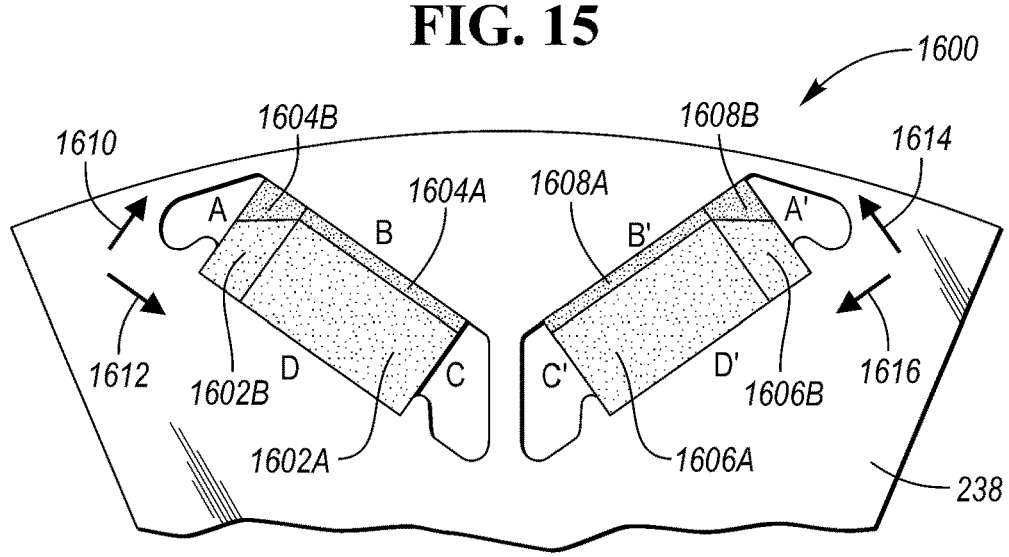
FIG. 16 is a side view of the rotor and a pair of irregular polyhedron shaped magnet assemblies that each include two quadrilateral permanent magnets embedded in the rotor configured to reduce demagnetization of the magnet assembly.

FIG. 16 is a side view of the rotor and a pair of irregular polyhedron shaped magnet assemblies that each include two quadrilateral permanent magnets embedded in the rotor configured to reduce demagnetization of the magnet assembly. In FIG. 16, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as two magnets (1602, 1604), the first magnet 1602 is illustrated as a two part quadrilateral prism, such that the first magnet 1602 has a short height along a first axis 1610 and a long length along a second axis 1612. Generally, a quadrilateral prism is a three-dimensional solid with two quadrilateral surfaces or faces (e.g., substantially parallel with the rotor laminations) at either end joined by four rectangular faces that are along the A side, the B side, the C side and the D side. And the poles of the magnet are the B side and the D side. Here, the first magnet 1602 may be a single pentagon prism or may be two individual prisms (1602A and 1602B). The second magnet 1604 is illustrated as a quadrilateral prism, having a long height along the first axis 1612 and having a short length along the second axis 1610. Likewise, the second magnet 1604 may be a single pentagon prism or may be two individual prisms (1604A and 1604B). Here, the second magnet 1604 has a greater coercivity than the first magnet 1602. The first and second magnets (1602, 1604) are configured to mate with each other such that the poles of each magnet (1602, 1604) are along the B side and the D side. The magnets (1602, and 1604) are arranged such that if the first magnet's B side is a north pole and the first magnet's D side is a south pole, then the second magnet's B side would be a north pole and the second magnet's D side would be a south pole such that they would be in series. The magnet assembly creates a magnetic field that interacts with the stator magnetic field when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1602, and 1604) cause demagnetization in certain areas of the magnets. By changing the shape and composition of the magnets, the demagnetization can be reduced. Here the magnets (1602, and 1604) are configured such that a coercivity of the second magnet 1604 is greater than the first magnet 1602 such that demagnetization of the magnetic assembly is reduced.

In FIG. 16, a mirror magnet assembly is shown in which magnets (1606, and 1608) mirror magnets (1602, and 1604) along mirror axis 1614 and 1616 having faces A', B', C', and D'.

Figure 17:
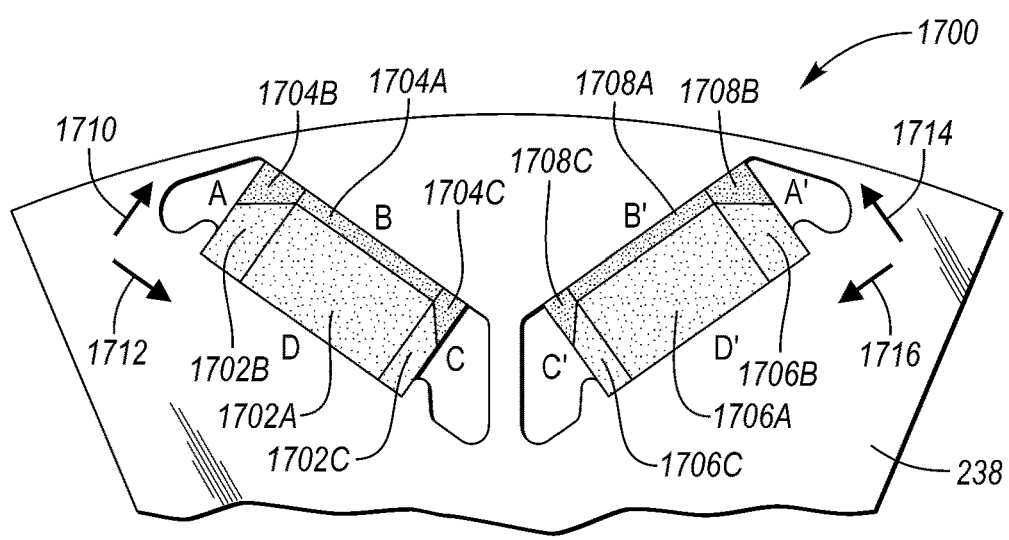
FIG. 17 is a side view of the rotor and a pair of irregular polyhedron shaped magnet assemblies that each include three quadrilateral permanent magnets embedded in the rotor configured to reduce demagnetization of the magnet assembly.

FIG. 17 is a side view of the rotor and a pair of irregular polyhedron shaped magnet assemblies that each include three quadrilateral permanent magnets embedded in the rotor configured to reduce demagnetization of the magnet assembly.

In FIG. 17, the first irregular polyhedron shaped magnet assembly has an A side, a B side, a C side, and a D side and the second irregular polyhedron shaped magnet assembly has an A' side, a B' side, a C' side, and a D' side. Referring back to the first irregular polyhedron shaped magnet assembly, this magnet assembly is illustrated as two magnets (1702, 1704), the first magnet 1702 is illustrated as a two part quadrilateral prism, such that the first magnet 1702 has a short height along a first axis 1710 and a long length along a second axis 1712. Generally, a quadrilateral prism is a three-dimensional solid with two quadrilateral surfaces or faces (e.g., substantially parallel with the rotor laminations) at either end joined by four rectangular faces that are along the A side, the B side, the C side and the D side. And the poles of the magnet are the B side and the D side. Here, the first magnet 1702 may be a single pentagon prism or may be two individual prisms (1702A, 1702B, and 1702C). The second magnet 1704 is illustrated as a quadrilateral prism, having a long height along the first axis 1710 and having a short length along the second axis 1712. Likewise, the second magnet 1704 may be a single pentagon prism or may be three individual prisms (1704A, 1704B, and 1704C). Here, the second magnet 1704 has a greater coercivity than the first magnet 1702. The first and second magnets (1702, 1704) are configured to mate with each other such that the poles of each magnet (1702, 1704) are along the B side and the D side. The magnets (1702, and 1704) are arranged such that if the first magnet's B side is a north pole and the first magnet's D side is a south pole, then the second magnet's B side would be a north pole and the second magnet's D side would be a south pole such that they would be in series. The magnet assembly creates a magnetic field that interacts with the stator magnetic field when a current is modulated through the stator windings (not shown) to generate a torque at the rotor 238 that causes the rotor 238 to rotate with respect to the stator. The magnetic assembly is shown with multiple corners. When the electric machine is operating, the interaction between the induced magnetic field from the stator teeth acting on the permanent magnets (1702, and 1704) cause demagnetization in certain areas of the magnets. By changing the shape and composition of the magnets, the demagnetization can be reduced. Here the magnets (1702, and 1704) are configured such that a coercivity of second magnet 1704 is greater than the first magnet 1702 such that demagnetization of the magnetic assembly is reduced.

In FIG. 17, a mirror magnet assembly is shown in which magnets (1706, and 1708) mirror magnets (1702, and 1704) along mirror axis 1714 and 1716 having faces A', B', C', and D'.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A permanent magnet machine comprising:
 a rotor defining at least one magnet opening and configured to rotate within a circular opening defined by a stator; and
 an irregular polyhedron shaped magnet assembly disposed in the magnet opening and defining a magnetization direction, the irregular polyhedron shaped magnet assembly including a pair of identical frustum-shaped magnets that are joined at their apexes to form a bifrustum having a bowtie-shaped cross section, wherein a height along the magnetization direction and perpendicular with a lamination plane of the rotor is greater at both ends than at a central portion disposed therebetween.

2. The permanent magnet machine of claim 1, wherein the irregular polyhedron shaped magnet assembly includes at least one concave surface substantially perpendicular with the magnetization direction and perpendicular with the lamination plane.

3. The permanent magnet machine of claim 2, wherein the at least one concave surface includes at least two flat surfaces.

4. The permanent magnet machine of claim 2, wherein the at least one concave surface includes a first and second concave surface, and wherein the first and second concave surfaces are on a top and a bottom of the irregular polyhedron shaped magnet assembly.

5. The permanent magnet machine of claim 2, wherein the at least one concave surface is two concave surfaces.

6. The permanent magnet machine of claim 1, wherein the frustums are joined such that their centerlines are coplanar.

7. A permanent magnet machine comprising:
- a rotor defining at least one magnet opening and configured to rotate within a circular opening defined by a stator; and
- a quadrilateral magnet assembly disposed in the magnet opening and including a pair of first and second magnets, the first magnet having a cross section with three straight sides and a first curvilinear side, the second magnet having two straight sides and a second curvilinear side extending between the two straight sides, wherein the first and second curvilinear sides match and nest with each other to join the first and second magnets into the quadrilateral magnet assembly that has a rectangular cross section.

8. The permanent magnet machine of claim 7 further comprising a second quadrilateral magnet assembly disposed in a second magnet opening of the rotor and including a pair of third and fourth magnets, the third magnet having a cross section with three straight sides and a first curvilinear side, the fourth magnet having two straight sides and a second curvilinear side extending between the two straight sides, wherein the first and second curvilinear sides of the third and fourth magnets match and nest with each other to join the third and fourth magnets into the second quadrilateral magnet assembly that has a rectangular cross section.

9. The permanent magnet machine of claim 7, wherein the first magnet has a greater coercivity than the second magnet.

10. A rotor comprising:
- an irregular polyhedron shaped magnet assembly defining a magnetization direction, the irregular polyhedron shaped magnet assembly including a pair of identical frustum-shaped magnets that are joined at their apexes to form a bifrustum having a bowtie-shaped cross section, wherein a height along the magnetization direction and perpendicular with a lamination plane of the rotor is greater at both ends than at a central portion disposed therebetween.

11. The rotor of claim 10, wherein the irregular polyhedron shaped magnet assembly includes at least one concave surface substantially perpendicular with the magnetization direction and perpendicular with the lamination plane.

12. The rotor of claim 11, wherein the at least one concave surface includes at least two flat surfaces.

13. The rotor of claim 11, wherein the at least one concave surface includes a first and second concave surface, and wherein the first and second concave surfaces are on a top and a bottom of the irregular polyhedron shaped magnet assembly.

14. The rotor of claim 11, wherein the at least one concave surface is two concave surfaces.

15. The rotor of claim 10, wherein the frustums are joined such that their centerlines are coplanar.

16. The rotor of claim 10 further comprising a body defining a magnet opening that receives the irregular polyhedron shaped magnet assembly therein.

* * * * *